United States Patent [19]
Baylor et al.

[11] Patent Number: 5,778,437
[45] Date of Patent: Jul. 7, 1998

[54] INVALIDATION BUS OPTIMIZATION FOR MULTIPROCESSORS USING DIRECTORY-BASED CACHE COHERENCE PROTOCOLS IN WHICH AN ADDRESS OF A LINE TO BE MODIFIED IS PLACED ON THE INVALIDATION BUS SIMULTANEOUSLY WITH SENDING A MODIFY REQUEST TO THE DIRECTORY

[75] Inventors: Sandra Johnson Baylor, Ossining; Yarsun Hsu, Pleasantville, both of N.Y.

[73] Assignee: International Business Machines Corporation, Armonk, N.Y.

[21] Appl. No.: 533,044

[22] Filed: Sep. 25, 1995

[51] Int. Cl.$^6$ ..................................................... G06F 12/00
[52] U.S. Cl. ........................ 711/141; 711/124; 711/144; 711/145; 711/146; 711/154; 711/121
[58] Field of Search ....................... 395/473, 477, 395/495, 471, 472; 711/121, 141, 147, 154, 124

[56] References Cited

U.S. PATENT DOCUMENTS

| | | | |
|---|---|---|---|
| 3,845,474 | 10/1974 | Lange et al. | 711/119 |
| 4,142,234 | 2/1979 | Bean et al. | 711/144 |
| 4,648,030 | 3/1987 | Bomba et al. | 711/141 |
| 4,959,777 | 9/1990 | Holman, Jr. | 395/468 |
| 5,025,365 | 6/1991 | Mathur et al. | 395/600 |
| 5,058,006 | 10/1991 | Durdan et al. | 395/449 |
| 5,197,139 | 3/1993 | Emma et al. | 395/677 |
| 5,226,144 | 7/1993 | Moriwaki et al. | 711/121 |
| 5,249,283 | 9/1993 | Boland | 711/146 |
| 5,276,852 | 1/1994 | Callander et al. | 395/309 |

(List continued on next page.)

OTHER PUBLICATIONS

A. Agarwal, et al., An Evaluation of Directory Schemes for Cache Coherence; 1988 IEEE, CH 2545, pp. 280–289.

L. Censier et al., A New Solution to Coherence Problems in Multicache Systems; IEEE Transactions on Computers; vol. C–27, No. 12, Dec. 1978, pp. 1112–1118.

M. Dubois, et al., Effects of Cache Coherency in Multiprocessors; IEEE Transac. on Comp., Vo. C–31, No. 11, Nov., 1982, pp. 1083–1099.

D. Lenoski, et al., The Directory–Based Cache Coherence Protocol for the DASH Multiprocessor; Proc. of the 17th Ann. Intl. Symp. of Comp. Arch., May 1990; pp. 1148–1159.

C. Tang; Cache System Design in the Tightly Coupled Multiprocessor System; Natl.Comp. Conf., 1976; pp. 749–753.

W. Yen, et al., Data Coherence Problem in a Multicache system; IEEE Trans. on Comp vol; C–34, No. 1, Jan. 1985 pp.56–65.

C. Wu et al.; On a Class of Multistage Interconnection Networks; IEEE Trans. on Comp., vol. C–29, No. 8; pp. 108–116.

(List continued on next page.)

*Primary Examiner*—Eddie P. Chan
*Assistant Examiner*—Hong C. Kim
*Attorney, Agent, or Firm*—Whitham, Curtis & Whitham; Douglas W. Cameron

[57] ABSTRACT

An optimization scheme for a directory-based cache coherence protocol for multistage interconnection network-based multiprocessors improves system performance by reducing network latency. The optimization scheme is scalable, targeting multiprocessor systems having a moderate number of processors. The modification of shared data is the dominant contributor to performance degradation in these systems. The directory-based cache coherence scheme uses an invalidation bus on the processor side of the network. The invalidation bus connects all the private caches in the system and processes the invalidation requests thereby eliminating the need to send invalidations across the network. In operation, a processor which attempts to modify data places an address of the data to be modified on the invalidation bus simultaneously with sending a store request for the data modification to the global directory and the global directory sends to the processor attempting to modify the data, in addition to the permission signal, a count of the number of invalidation acknowledgments the processor should receive.

10 Claims, 7 Drawing Sheets

U.S. PATENT DOCUMENTS

| | | | |
|---|---|---|---|
| 5,283,886 | 2/1994 | Nishii et al. | 395/471 |
| 5,303,362 | 4/1994 | Butts, Jr. et al. | 711/121 |
| 5,313,609 | 5/1994 | Baylor et al. | 395/448 |
| 5,333,296 | 7/1994 | Bouchard et al. | 711/171 |
| 5,345,578 | 9/1994 | Manasse | 711/146 |
| 5,398,325 | 3/1995 | Chang et al. | 395/403 |
| 5,428,761 | 6/1995 | Herlihy et al. | 395/457 |
| 5,511,224 | 4/1996 | Tran et al. | 395/800 |

OTHER PUBLICATIONS

L. Bhuyan, et al; Analysis of MIN Based Multiprocessors with Private Cache Memories; Intl. Conf on Parallel Proc.; 1989, pp. I–51–I–58.

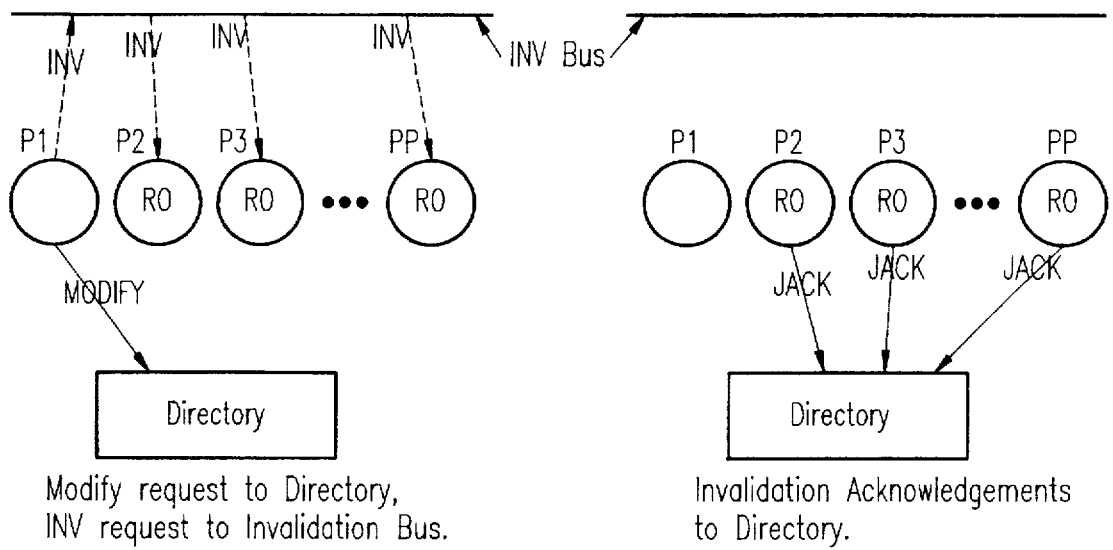
Modify request to Directory,
INV request to Invalidation Bus.
FIG.4A
Invalidation Acknowledgements
to Directory.
FIG.4B
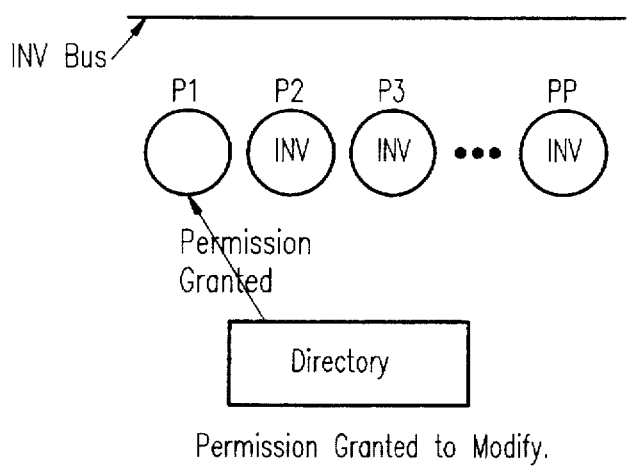
Permission Granted to Modify.
FIG.4C Modify request to Directory,
INV request to Invalidation Bus.

Invalidation Acknowledgements
to Requestor via the INV Bus,
Permission Granted to
Request via the MIN. x-number
of processors sharing line.

Traditional Invalidation Protocol — 16 units 12 units

Optimized Traditional Invalidation Protocol 9 units

Using Invalidation Bus for Invalidations.

8 units

Using INV Bus for Invalidations and Acknowledgements.

| dtag (V) | gstate (2) | PID (log P) 1  2 | — | PID (log P) N  2 | WTEVNT (1) | RQEVNT (2) | dtag – directory tag gstate – global state

PID – processor identification

WTEVNT – waiting for write-back or invalidation acknowledgements

RQEVNT – the requested event that caused the write-back/invalidation acknowledgements to occur

FIG. 7A
PRIOR ART

| dtag (V) | gstate | WTEVNT (1) | RQEVNT (2) | dtag – directory tag gstate – global state

WTEVNT – waiting for write-back or invalidation acknowledgements

RQEVNT – the requested event that caused the write-back/invalidations to occur

FIG. 7B

INVALIDATION BUS OPTIMIZATION FOR MULTIPROCESSORS USING DIRECTORY-BASED CACHE COHERENCE PROTOCOLS IN WHICH AN ADDRESS OF A LINE TO BE MODIFIED IS PLACED ON THE INVALIDATION BUS SIMULTANEOUSLY WITH SENDING A MODIFY REQUEST TO THE DIRECTORY

DESCRIPTION

BACKGROUND OF THE INVENTION

1. Field of the Invention

The present invention generally relates to multiprocessor systems in which a plurality of processors, each having a private cache, are connected to shared memory using a multistage interconnection network and, more particularly, to improving system performance with an invalidation bus optimization for multiprocessor systems using directory-based cache coherence protocols.

2. Background Description

The advent of parallel processing systems has resulted in the potential for increased performance over traditional uniprocessor systems. Main memory bandwidth has not been able to meet the demands made by increasingly faster processors in such systems. One method to alleviate the access gap resulting from this problem is to associate with the processor a small high-speed buffer known as a cache memory. This cache memory is typically an order of magnitude faster than main memory and it usually matches the speed of the processor.

Shared memory multiprocessors are typically composed of a number of processors with associated private cache memories, global memory and an interconnection network between the processors and some or all of global memory. The global memory forms the main memory which is shared by the processors and is often implemented as a plurality of memory modules. The introduction of multiple caches with possible multiple copies of memory lines in shared memory systems may result data inconsistencies. There are generally two methods currently available to solve this problem; hardware and software enforced cache coherence. The present invention is directed to a hardware cache coherence protocol.

Hardware protocols may be subdivided into two types: bus- (or snoopy-) based and directory-based. Bus-based protocols are generally used for systems with a relatively small number of processors, whereas directory-based protocols are used in larger systems with improved scalability. In directory-based protocols, a global directory is usually associated with main memory and primarily contains information used to determine the global state of a cache line as well as the number and/or location of the cache memories having a copy of the line.

In traditional directory-based cache coherence protocols, there is no global mechanism that allows all processors to view cache coherence activity at the same time. Therefore, a global directory is used to record the global state of lines and the identities or the number of the processors with a copy of the line. When a processor attempts to modify a line and it does not have exclusive read/write access to the line, then it sends a modify request to the global directory entry associated with the line via a multistage interconnection network (MIN). The directory will then send invalidations to the processors with a copy of the line or broadcast invalidations to all processors if the identities of the processors with a copy of the line are not known (also via the MIN). Invalidation acknowledgments are then sent either back to the directory or to the cache requesting to modify the line via the MIN. The overhead associated with the invalidations and acknowledgments traversing the MIN causes considerable contention in the MIN, reducing performance.

Several studies have been conducted on global directory based cache coherence protocols. See, for example, the following publications:

A. Agarwal, R. Simoni, J. Hennessy, and M. Horowitz, "An Evaluation of Directory Schemes for Cache Coherence", *Proceedings of the 15th Annual International Symposium on Computer Architecture*, pp. 280–289, Honolulu, Hi., IEEE Computer Society Press, 1988.

L. M. Censier and P. Feautrier, "A New Solution to Coherence Problems in Multicache Systems", *IEEE Transactions on Computers*, Vol. C-27, No. 12, pp. 1112–1118, December 1978

M. Dubois and F. A. Briggs, "Effects of Cache Coherency in Muliprocessors", *IEEE Transactions on Computers*, Vol. C-31, No. 11, November 1982

Daniel Lenoski, James Landon, Kourosh Gharachorloo, Anoop Gupta, and John Hennessy, "The Directory-Based Cache Coherence Protocol for the DASH Multiprocessor", *Proc. of the 17th Annual International Symposium of Computer Architecture*, May 1990, pp. 148–159

C. K. Tang, "Cache System Design in the Tightly Coupled Multiprocessor System", *Proceedings of the 1976 National Computer Conference*, pp. 749–753, 1976

W. C. Yen, D. W. L. Yen, and K. S. Fu, "Data Coherence Problem in a Multicache System", *IEEE Transactions on Computers*, pp. 56–65, January 1985

However, none of these studies have considered the results of reducing the effect of network latencies caused by invalidations and subsequent acknowledgements on the performance of these protocols. Multiprocessors using multistage interconnection networks (MIN) and private caches typically use a directory-based cache coherence protocol to maintain data consistency, but network delay can limit the performance of such systems because processor writes that result in invalidations require two round-trips across the network.

L. N. Bhuyan and I. Ahmed in "Analysis of MIN Based Multiprocessors With Private Cache Memories", *Proceedings of the International Conference on Parallel Processing*, Vol. I, pp. 51–58, 1989, presented a multiprocessor with a snooping bus associated with the caches and an interconnection network connecting the processors with the memory modules. In their system, all coherence related activity occurs via this bus. Since the bus serves as a global communication source for the multiprocessor system, no invalidation acknowledgments are required in the cache coherence protocol. The MIN is used only for data transfers between the caches and memory. Bhuyan and Ahmed suggest that this architecture is scalable for up to 64 processors. There is, however, the possibility that the snooping bus will saturate as the number of processors increases, limiting system scalability.

SUMMARY OF THE INVENTION

It is therefore an object of the present invention to provide an optimization scheme for use in multistage interconnection networks (MIN) used in scalable multiprocessor systems which provide cache coherency without the network delay typically encountered in such systems yet maintaining the scalability of the system.

It is another more specific object of the invention to provide a global directory based cache coherence protocol for scalable multiprocessor systems which reduces the penalty of network latency and improves system performance.

According to the invention, an invalidation bus is used only for invalidations or for invalidations and acknowledgments. A shared memory multiprocessor system with private caches, a multistage interconnection network (MIN) and interleaved memory modules are assumed in the practice of the preferred embodiment of the invention. The cache coherence protocol is assumed to be implemented by a directory-based protocol. The subject invention is designed specifically to reduce the MIN overhead of invalidations and acknowledgments in directory-based coherence protocols.

The optimization scheme according to the invention includes an invalidation bus on the processor side of the multistage interconnection network (MIN) to invalidate all data in remote caches when a processor attempts to modify shared data. The invalidation bus provides the global mechanism to facilitate processors concurrently viewing the invalidation activity of the coherence protocol. Since a directory-based protocol is assumed, the directory still needs to keep state information about a cache line. However, the subject invention differs from traditional directory-based protocols because it does not have to know the identities of the caches with a copy of the line. It only has to know the actual number of caches with a copy of the line. Therefore, if an invalidation is placed on the bus, invalidation acknowledgments are also necessary so the directory will know that all caches with a copy of the line have invalidated their copy of that line.

The differences between the invention and the Bhuyan and Ahmed architecture is the fact that they use a bus-based cache coherence protocol. The cache coherence is implemented entirely on the bus. In contrast, the subject invention uses a directory-based cache coherence protocol. The majority of the coherence protocol is implemented using the directory. This requires the use of invalidation acknowledgments not required in the Bhuyan and Ahmed snoopy-bus approach. At the same time, the invention differs from traditional directory-based protocols because there is no need to keep track of the processors that have a copy of the line and there is added an invalidation bus used for invalidations. Only the actual number of processors with a copy of the line is required. Therefore, the global directory size requirements are smaller, and the invalidation bus results in reduced MIN contention, improving performance.

The global directory is implemented in a preferred embodiment as a plurality of global directory modules associated with the memory modules forming a distributed global directory. The invalidation bus is used to optimize the protocol action required when a processor attempts to write a shared cache line. A processor attempting to modify data in its cache places the address of the data on the invalidation bus and simultaneously sends a store request to the global directory. Since all the caches are connected to the invalidation bus, those caches with a copy of the data will observe that the data is about to be modified and subsequently invalidate their copies. Those caches which invalidate their copies will also send invalidation acknowledgment signals to the global directory. Simultaneously, the processor sends the store request to the global directory. The global directory waits for the invalidation acknowledgments and then sends a permission granted signal to the processor.

Without this invalidation bus, two round-trips across the network are required under the traditional directory-based cache coherence protocol. The invalidation bus of the invention improves the performance of scalable systems by overlapping store requests and invalidations and thus reducing trips through the network. Bhuyan and Ahmed suggest that their approach is scalable for up to 64 processors. The subject invention is more scalable. For example, assume a P-processor multiprocessor system with half the processors holding a read-only copy of a cache line. Another processor wants to modify the line and then all P/2 processors attempt to modify the line. In the Bhuyan and Ahmed architecture, the cache of the first processor will place an invalidation signal on the bus. All P/2 processors will then invalidate their respective copies of the line and the line is then transferred to the requesting cache. Next, all P/2 processors will then attempt to modify the line, arbitrating for the bus to send an invalidation and to get a copy of the line. Typically, it takes one bus cycle to send an invalidation and ls/4 bus cycles (where ls is the line size, in bytes) to transfer the line over the bus. Therefore, the number of bus cycles required to complete this transaction is shown below:

$$\left(\frac{P}{2}+1\right)\left(1+\frac{ls}{4}\right)$$

The scalability of the multiprocessor system is limited by the demands placed on the bus. The above relationship serves as a first-order approximation of the demand placed on the bus in the Bhuyan and Ahmed system.

According to a first embodiment of the subject invention, only invalidations are placed on the bus. Therefore, the total number of bus cycles required to complete the transaction is shown below:

$$\frac{P}{2}+1$$

In a second embodiment of the invention, the total number of bus cycles required include invalidations and acknowledgments as shown below, where invalidation acknowledgments are assumed to use one bus cycle:

$$P+\frac{P}{2}+1$$

For a 64 processor system with a line size of 128 bytes, the Bhuyan and Ahmed architecture requires 1089 bus cycles. In contrast, the first embodiment of the subject invention for the same number of processors requires only 33 bus cycles, and the second embodiment of the invention requires 97 bus cycles. As a result the first embodiment of the subject invention is 1089/33=33 times more scalable and the second embodiment is 1089/96=11 times more scalable. Therefore, for the same performance as a 64 processor system according to Bhuyan and Ahmed, the invention is scalable to at least 64×33=2112 and 64×11=704 processors for the first and second embodiments, respectively.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A, 4B and 4C are functional block diagrams illustrating the invalidation protocol according to a first embodiment of the invention in which the invalidation bus is used for invalidations only;

FIGS. 7A and 7B are memory maps respectively showing an N-entry distributed global directory for the traditional invalidation approaches and the first and second embodiments according to the invention.

DETAILED DESCRIPTION OF PREFERRED EMBODIMENTS OF THE INVENTION

Figure 1A:
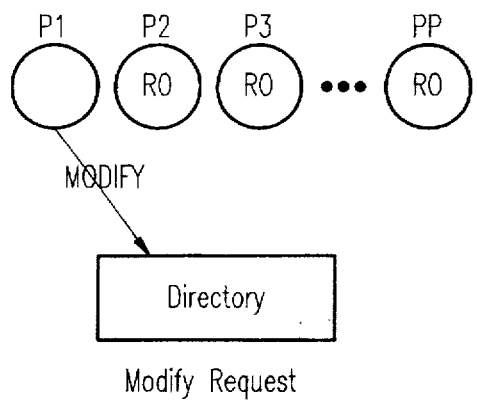
FIGS. 1A, 1B, 1C, and 1D are functional block diagrams illustrating a traditional invalidation protocol in a directory-based cache coherence multiprocessor system.
Figure 1B:
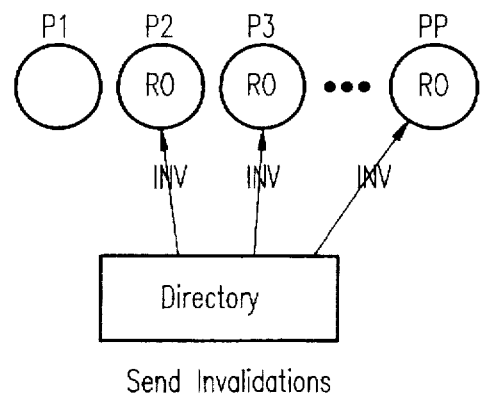
Figure 1C:
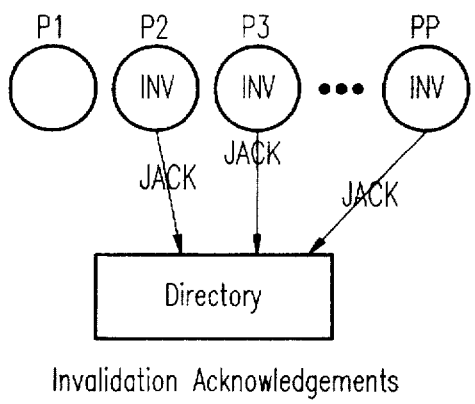
Figure 1D:
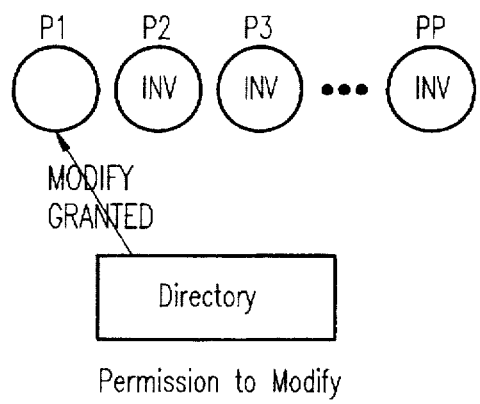

Referring now to the drawings, and more particularly to FIGS. 1A to 1D, there is shown the traditional directory-based invalidation protocol in a multiprocessor system. A multiprocessor system including a multistage interconnection network (MIN) is assumed. All communications between the processors and the directory are via the MIN (not shown). In FIG. 1A, processor P1 issues a modify request to the directory. Each of the other processors P2 to PP are assumed to have read only access to the line or lines for which the modify request is made, and this information is stored in the directory. In FIG. 1B, the directory issues invalidations to each of the other processors P2 to PP. Then, in FIG. 1C, the processors P2 to PP each invalidate their respective copies of the lines and send invalidation acknowledgments to the directory. Only when the directory has received all the invalidation acknowledgments from each processor having a copy of the line or lines to be modified does the directory grant the modify request to processor P1 in FIG. 1D.

Figure 2A:
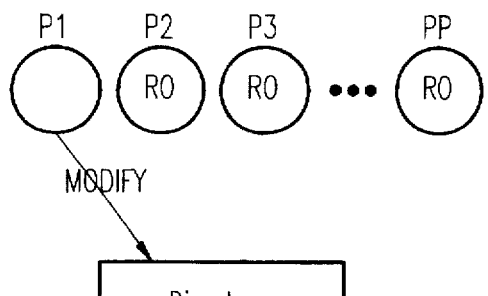
FIGS. 2A, 2B and 2C are functional block diagrams illustrating an optimized traditional invalidation protocol.
Figure 2B:
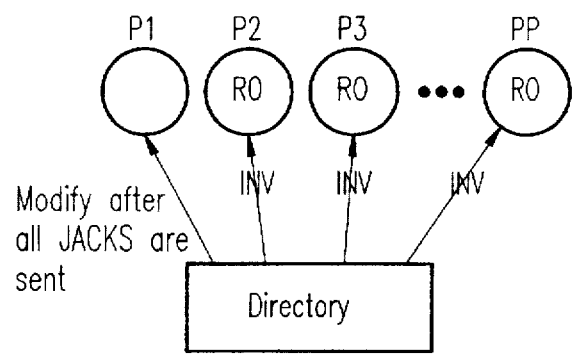
Figure 2C:
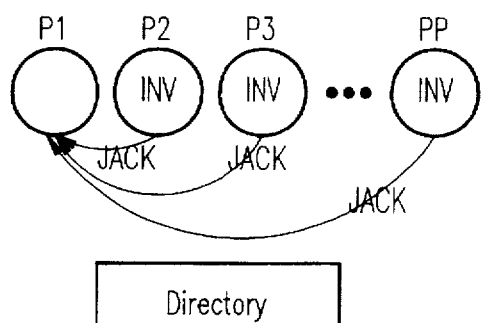

The traditional invalidation protocol has been optimized in FIGS. 2A to 2C. As before, processor P1 sends a modify request to the directory in FIG. 2A, but in addition to sending invalidations to each of the processors P2 to PP, the directory also sends a conditional grant of the modify request to processor P1. The grant of the modify request is conditioned on processor P1 receiving a predetermined number of invalidation acknowledgments from the other processors, this predetermined number being given to processor P1 by the directory with the conditional grant of the modify request. In FIG. 2C, processor P1 receives directly the invalidation acknowledgments from each of processors P2 to PP, after which processor P1 is free to modify the line or lines.

Figure 3:
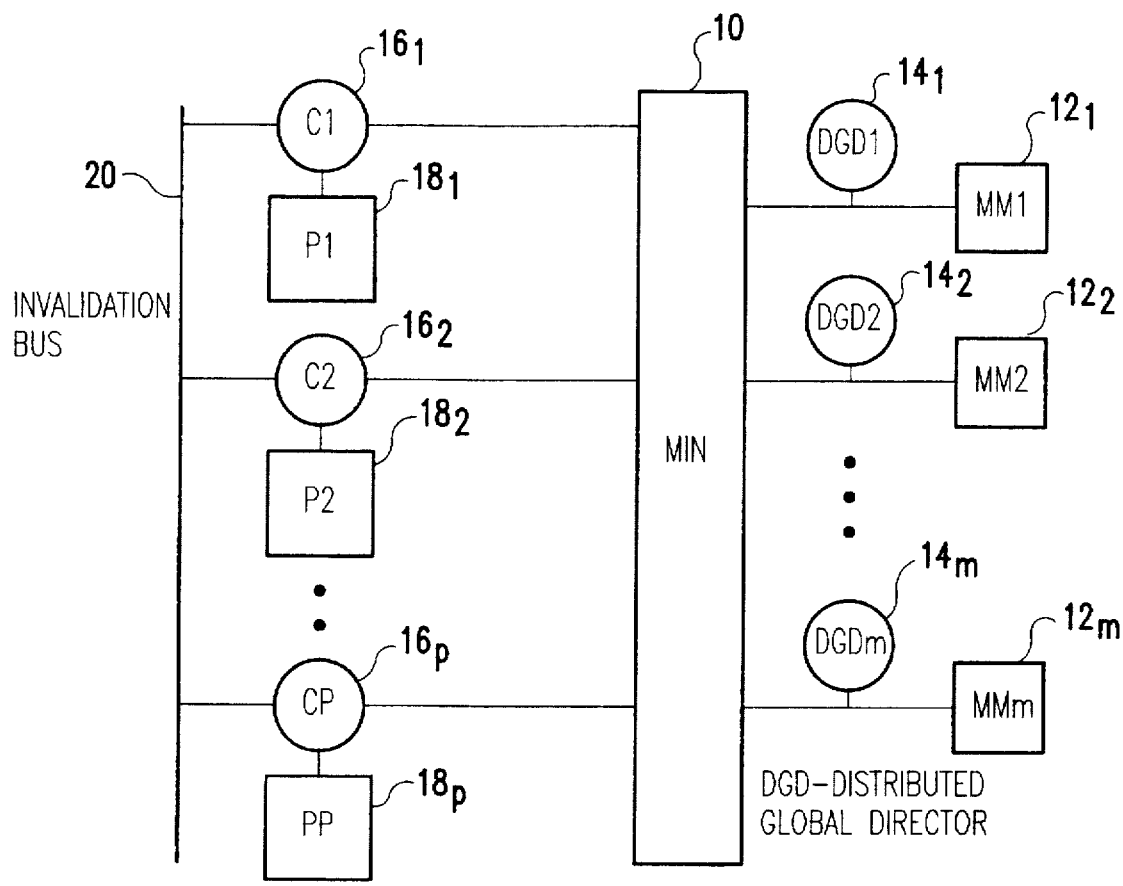
FIG. 3 is a functional diagram of a system with a directory and invalidation bus according to a preferred embodiment of the invention.

In FIG. 3, there is shown a functional block diagram of a MIN-based multiprocessor system which implements the subject invention. The system includes a multistage interconnection network (MIN) 10 to which a plurality of memory modules (MM) $12_1$ to $12_m$ are attached. Multistage interconnection networks (MINs) are well known in the art. See, for example, Chuan-Lin Wu and Tse-Yun Feng, "On a Class of Multistage Interconnection Networks", *IEEE Transactions on Computers*, vol. C-29, No. 8, August 1980, pp. 694-702. The memory modules $12_1$ to $12_m$ comprise the shared main memory of the system. Associated with the main memory is a global directory which contains information used to determine the global state of a cache line as well as the number and/or location of the cache memories having a copy of the line.

The global directory in the system shown in FIG. 3 is composed of a plurality of global directory modules $14_1$ to $14_m$ distributed with the memory modules forming a distributed global directory (DGD) 14. The DGD 14 contains information used to determine the global state of a cache line as well as the number and/or location of the caches having a copy of the line. Also attached to the MIN 10 are a plurality of caches (C) $16_1$ to $16_p$, which are the local caches for corresponding processors (P) $18_1$ to $18_p$. Each of these caches are connected directly to an invalidation bus 20 which, as described in more detail below, optimizes the processing of an invalidation request issued by one of the processors and eliminates the need to send invalidations across the network.

The distributed global directory 14 may not know which caches have a copy of the line. There are several design options for cache identification. One design alternative has the directory with information to determine all caches with a copy of the line. Another design alternative is to have a small number of cache identifiers per directory entry. If the number of caches sharing the line is less than or equal to the number of cache identifiers, then the directory will know which cache has the line. Otherwise, the directory will only know the number of caches with the line.

FIGS. 4A to 4C illustrate the invalidation protocol according to a first embodiment of the invention. In FIG. 4A, processor P1 issues a modify request to the directory and at the same time places an invalidation request on the invalidation bus. Those processors having copies of the line or lines to be modified, as identified by an address or addresses on the invalidation bus, will invalidate the corresponding line or lines and send an invalidation acknowledgment to the directory, as shown in FIG. 4B. When the directory receives all the invalidation acknowledgments, it grants permission to processor P1 in FIG. 4C.

Figure 5A:
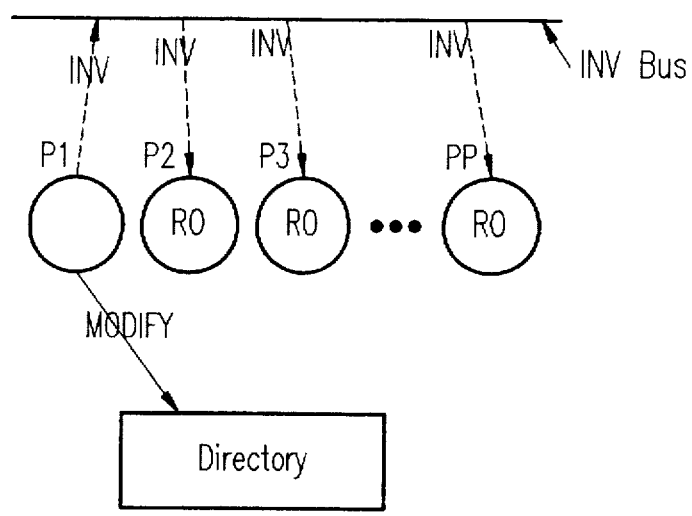
FIGS. 5A and 5B are functional block diagrams illustrating the invalidation protocol according to a second embodiment of the invention in which the invalidation bus is used for both invalidations and acknowledgments.
Figure 5B:
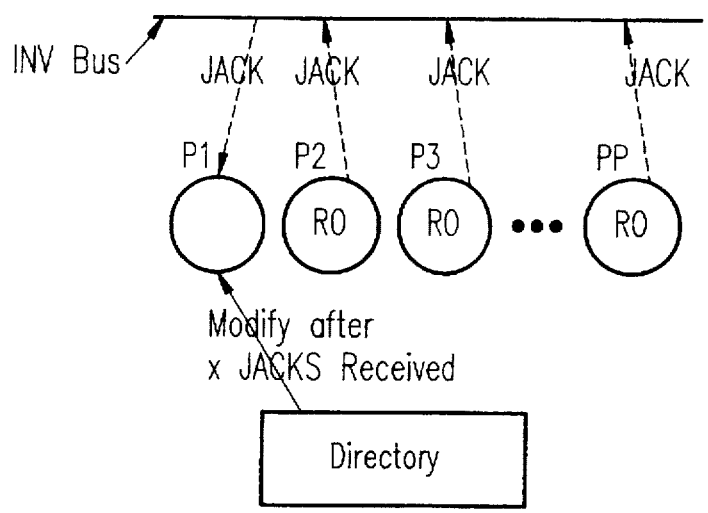

FIGS. 5A and 5B illustrate the invalidation protocol according to a second embodiment of the invention. In FIG. 5A, processor P1 issues a modify request to the directory and at the same time places an invalidation request on the invalidation bus. In FIG. 5B, the directory responds to processor P1 with a conditional grant to modify after receiving a number of invalidation acknowledgments corresponding to the number of processors having copies of the line or lines to be modified. This time, the invalidation acknowledgments are supplied to processor P1 via the invalidation bus directly from the other processors.

Figure 6A:
FIGS. 6A, 6B, 6C, and 6D are, respectively, timing diagrams illustrating the time required to process a request for the traditional invalidation protocol, the optimized traditional invalidation protocol and the first and second embodiments of the invention.

FIGS. 6A to 6D are timing diagrams contrasting the performances of the several protocols. The operation of the traditional system shown in FIGS. 1A to 1D is illustrated in FIG. 6A. Assume that the network delay comprises four units and a bus cycle comprises one unit of time. Since the modify request must be made via the network to the directory, the modify request consumes four units of time in FIG. 6A. Likewise, the invalidations must be communicated from the directory to the other processors holding a copy of the line or lines to be modified via the network, again consuming four units of time. The invalidation acknowledgments once again must be transmitted via the network to the directory, consuming another four units of time. Finally, the directory transmits the grant of the modify request to the requesting processor via the network, consuming yet another four units of time. Altogether, the process has consumed sixteen units of time.

Figure 6B:
Figure 6B:

The optimized traditional protocol shown in FIGS. 2A to 2C is illustrated in FIG. 6B. Here the first two cycles are the same as in the traditional protocol. However, since the grant of the modify request is conditional on the requesting processor receiving all invalidation acknowledgments directly from the other processors, there is an overlap of the grant cycle with either the invalidation cycle or the invalidation acknowledgment cycle, resulting in a saving of four time units.

Figure 6C:
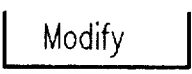
Figure 6C:

In contrast to the traditional and optimized traditional protocols, both of the embodiments of the invention save a considerable amount of time, significantly improving the performance of larger multiprocessor systems. The first embodiment protocol shown in FIGS. 4A to 4C is illustrated in FIG. 6C. Since the modify request is simultaneously placed on the invalidation bus and transmitted to the directory via the network, there is but a one cycle bus delay before the other processors begin to transmit invalidation acknowledgments to the directory. Thus, the directory within one bus cycle delay after receiving the modification request transmits the grant via the network to the requesting processor. This cycle is completed in only nine time units.

Figure 6D:
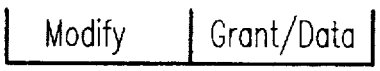
Figure 6D:

The protocol according to the second embodiment results in an even greater time savings and hence performance advantage. This protocol, shown in FIGS. 5A and 5B, is illustrated in FIG. 6D. In this case, the invalidation bus carries both the modify request and the responding invalidation acknowledgments. Thus, the directory immediately upon receiving the modify request issues the conditional grant, resulting in only eight time units for the cycle to be completed.

The memory maps for an N-entry distributed global directory for a traditional N-entry distributed global directory and the N-entry global director for the first and second embodiments of the invention are respectively shown in FIGS. 7A and 7B. In the traditional directory shown in FIG. 7A, an entry is composed of a directory tag (dtag), a global state (gstate), processor identification (PID) for each of N processors, an event flag indicating waiting for write-back or invalidation acknowledgements (WTEVNT), and an event flag for the requested event that caused the writ-back/invalidation acknowledgements to occur (RQEVNT). To provide a more compact entry, the PIDs can be replaced by a P-vector where each bit denotes a processor. In contrast, the N-entry distributed global directory for the invention is much simpler, eliminating the need for the PIDs or P-vector. As shown in FIG. 7B, an entry in the global directory in the practice of the present invention requires only the dtag, gstate, and WTEVNT and RQEVNT flags.

While the invention has been described in terms of two preferred embodiments, those skilled in the art will recognize that the invention can be practiced with modification within the spirit and scope of the appended claims.

Having thus described our invention, what we claim as new and desire to secure by Letters Patent is as follows:

1. A shared memory multiprocessor system comprising:
   a plurality of processors each having an associated cache memory;
   a multistage interconnection network coupled to each processor's cache memory;
   a plurality of interleaved memory modules coupled to the multistage interconnection network;
   a global directory containing information used to determine a global state of a cache line, said global directory comprising a plurality of global directory modules which comprise a distributed global directory, each memory module having an associated global directory module; and
   an invalidation bus directly coupled to each of the cache memories, wherein a processor attempting to modify data places an address of the data to be modified on the invalidation bus and simultaneously sends a store request for the data modification to the global directory, and wherein all of said cache memories having a copy of a cache line as identified by the address on the invalidation bus is invalidated, said global directory sending a permission signal to the processor permitting the data to be modified.

2. The shared memory multiprocessor system recited in claim 1 wherein the global directory further contains information on the number of cache memories having a copy of the cache line.

3. The shared memory multiprocessor system recited in claim 1 wherein a cache memory upon invalidating a copy of a cache line as identified by the address on the invalidation bus sends an invalidation acknowledgment signal to the global directory, and upon receipt of the invalidation acknowledgment signal, said global directory sending said permission signal to the processor attempting to modify data.

4. The shared memory mulitprocessor system recited in claim 1 wherein a cache memory upon invalidating a copy of a cache line as identified by the address on the invalidation bus sends an invalidation acknowledgment signal directly to the processor attempting to modify data and said global directory sends, in addition to said permission signal sent to the processor attempting to modify data, a count of the number of invalidation acknowledgments the processor should receive.

5. A method for an invalidation protocol for maintaining cache coherence in a shared memory multiprocessor system in which a plurality of interleaved memory modules are coupled to a plurality of processors via a multistage interconnection network, each of said plurality of processors having a cache memory associated therewith, said invalidation protocol comprising the steps of:
   providing a global directory containing information used to determine a global state of a cache line, said global directory comprising a plurality of global directory modules comprising a distributed global directory, each memory module having an associated global directory module;
   providing an invalidation bus directly coupled to each said cache memory;
   placing, by a processor which attempts to modify data, an address of the data to be modified on the invalidation bus simultaneously with sending a store request for the data modification to the global directory;
   invalidating a cache line by all cache memories having a copy of said cache line as identified by the address on the invalidation bus their copies; and
   sending, by said global directory, a permission signal to the processor permitting the data to be modified.

6. The method for the invalidation protocol recited in claim 5 further comprising the steps of:
   sending an invalidation acknowledgment signal to the global directory by a cache memory upon invalidating a copy of said cache line as identified by the address on the invalidation bus; and
   sending said permission signal to the processor attempting to modify data by said global directory upon receipt of the invalidation acknowledgment signals.

7. The method for the invalidation protocol recited in claim 5 further comprising the steps of:

a cache memory, upon invalidating a copy of a cache line as identified by the address on the invalidation bus, sending an invalidation acknowledgment signal directly to the processor attempting to modify data; and said global directory sending, in addition to said permission signal sent to the processor attempting to modify data, a count of the number of invalidation acknowledgments the processor should receive.

8. A system for maintaining cache memory coherence for a multiprocessor system where particular cache memories holding a particular cache line to be modified is unknown, comprising:

a plurality of processors and associated cache memories;

an invalidation bus connecting each of said cache memories;

a global directory containing information related to a number of said cache memories storing a particular a cache line; and an invalidation bus directly coupled to each of the cache memories, wherein a processor attempting to modify a particular cache line places an address for said particular cache line on said invalidation bus such that each of said cache memories storing said particular cache line invalidates said particular cache line and causes an acknowledgment signal to be sent to said global directory, wherein if said a number of said acknowledgment signals matches said number of said cache memories storing said particular cache line a permission granted signal is sent to said processor attempting to modify said particular cache line.

9. A system for maintaining cache memory coherence for a multiprocessor system as recited in claim 8 wherein said global directory comprises a plurality of global directory modules.

10. A system for maintaining cache memory coherence for a multiprocessor system as recited in claim 9 wherein said global directory comprises a distributed global directory.

* * * * *